US012724984B2

(12) United States Patent
Wahed et al.

(10) Patent No.: US 12,724,984 B2
(45) Date of Patent: Sep. 1, 2026

(54) HIERARCHICAL MULTI-ARMED BANDIT FOR LEXICON EXPANSION

(71) Applicant: International Business Machines Corporation, Armonk, NY (US)

(72) Inventors: Muntasir Wahed, Blacksburg, VA (US); Daniel Gruhl, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 18/062,208

(22) Filed: Dec. 6, 2022

(65) Prior Publication Data

US 2024/0184999 A1 Jun. 6, 2024

(51) Int. Cl.

| | |
|---|---|
| ***G06F 17/27*** | (2006.01) |
| ***G06F 40/237*** | (2020.01) |
| ***G06F 40/30*** | (2020.01) |
| ***G06F 40/47*** | (2020.01) |

(52) U.S. Cl.

CPC ............ *G06F 40/47* (2020.01); *G06F 40/237* (2020.01); *G06F 40/30* (2020.01)

(58) Field of Classification Search

CPC ........ G06F 40/10; G06F 40/30; G06F 40/237; G06F 40/47; G06F 40/279; G06F 40/242; G06F 40/247; G06F 40/12; G06N 20/00; G06N 3/08; G06N 3/045; G06N 3/088; G06N 3/02; G06N 5/022

See application file for complete search history.

(56) References Cited

U.S. PATENT DOCUMENTS

| | | | |
|---|---|---|---|
| 6,188,976 | B1 | 2/2001 | Ramaswamy et al. |
| 7,805,288 | B2 | 9/2010 | Guo et al. |
| 10,032,448 | B1 | 7/2018 | Baughman et al. |
| 10,043,511 | B2 | 8/2018 | Baughman et al. |
| 10,740,379 | B2 | 8/2020 | Alba et al. |
| 11,030,402 | B2 | 6/2021 | Ristoski et al. |
| 11,163,952 | B2 | 11/2021 | Gentile et al. |

(Continued)

FOREIGN PATENT DOCUMENTS

| | | | |
|---|---|---|---|
| CN | 106951526 A | 7/2017 | |
| WO | WO-2022159198 A1 * | 7/2022 | ............ G06N 3/045 |

OTHER PUBLICATIONS

Kreutzer, Julia, David Vilar, and Artem Sokolov. "Bandits don't follow rules: Balancing multi-facet machine translation with multi-armed bandits." arXiv preprint arXiv:2110.06997 (2021). (Year: 2021).*

(Continued)

*Primary Examiner* — Michael Ortiz-Sanchez
(74) *Attorney, Agent, or Firm* — CANTOR COLBURN LLP; Kelsey M. Skodje

(57) ABSTRACT

Disclosed herein are methods, systems, and computer program products for selecting an artificial intelligence (AI) model. Aspects include receiving, by a multi-armed bandit agent, candidate entities from multiple set expansion models and selecting a subset of the candidate entities for a first set expansion task, wherein a first candidate entity of the selected subset of candidate entities is selected from a first model by a subject matter expert. Aspects also include selecting, by the multi-armed bandit agent, based on the first candidate entity selected by the subject matter expert, the first model from the set expansion models for generating further candidate entities.

20 Claims, 6 Drawing Sheets

(56) References Cited

U.S. PATENT DOCUMENTS

| | | | | |
|---|---|---|---|---|
| 11,244,116 | B2 | 2/2022 | Bull et al. | |
| 11,328,121 | B2 | 5/2022 | Barbosa et al. | |
| 11,869,490 | B1 * | 1/2024 | Gupta | G10L 15/1822 |
| 2008/0250015 | A1 | 10/2008 | Guo et al. | |
| 2017/0220584 | A1 | 8/2017 | Gruhl et al. | |
| 2017/0337185 | A1 | 11/2017 | Barbosa et al. | |
| 2018/0197530 | A1 | 7/2018 | Baughman et al. | |
| 2018/0197531 | A1 | 7/2018 | Baughman et al. | |
| 2018/0225374 | A1 | 8/2018 | Alba et al. | |
| 2019/0197486 | A1 * | 6/2019 | Jersin | G06F 16/735 |
| 2020/0035222 | A1 * | 1/2020 | Sypniewski | G06N 3/044 |
| 2021/0064702 | A1 | 3/2021 | Bull et al. | |
| 2022/0374482 | A1 * | 11/2022 | G Rao | G06F 16/9535 |
| 2023/0186037 | A1 * | 6/2023 | Lee | G06N 20/00 704/2 |

OTHER PUBLICATIONS

Chen, Wei, et al. "Combinatorial multi-armed bandit and its extension to probabilistically triggered arms." Journal of Machine Learning Research 17.50 (2016): 1-33. (Year: 2016).*
Alba et al, "Multi-lingual Concept Extraction With Linked Data and Human-in-the-Loop", K-CAP, 2017, 8 pages.
Anonymous, "Human-in-the-Loop Set Expansion using Multi-Armed Bandits", Princeton University, 13 pages.
Auer, "Using Confidence Bounds for Exploitation-Exploration Trade-offs", Journal of Machine Learning Research 3, 2002, pp. 397-422.
Auer, et al, "Finite-time Analysis of the Multiarmed Bandit Problem", Machine Learning, 2002, pp. 235-256.
Budd, et al, "A survey on active learning and human-in-the-loop deep learning for medical image analysis", Elsevier, Medical Image Analysis, 2021, 16 pages.
Chakrabarti, et al, "Mortal Multi-Armed Bandits", Advances in Neural Information Processing Systems, 2008, 8 bages.
Chen, et al, "Combinatorial Multi-Armed Bandit: General Framework, Results and Applications", Proceedings of the 30th International Conference on Machine Learning, vol. 28, 2013, 9 pages.
Chen, et al, "Entity Set Expansion with Semantic Features of Knowledge Graphs", Journal of Web Semantics, 2018, 15 pages.
Coden, et al, "Spot the drug! An unsupervised pattern matching method to extract drug names from very large clinical corpora", 2012 IEEE Second Conference on Healthcare Informatics, Imaging and Systems Biology, 2012, pp. 33-39.
Dooley, et al, "Foodon: a harmonized food ontology to increase global food traceability, quality control and data Integration", npj Science of Food, 2018, pp. 1-10.
Felicio, et al, "A Multi-Armed Bandit Model Selection for Cold-Start User Recommendation", ACM, 2017, 9 pages.
Fouilloy, et al, "Solar irradiation prediction with machine learning: Forecasting models selection method depending on weather variability", Elsevier, Energy, 165, 2018, pp. 620-629.
Gentile, et al. "Explore and Exploit. Dictionary Expansion with Human-in-the-Loop", European Semantic Web Conference. Springer, Cham, 2019, pp. 131-145.
Ghahramani, et al, "Bayesian Sets", In Proceedings of the 18th International Conference on Neural Information Processing Systems (NIPS), 2005, 8 pages.
Gurulingappa, et al, "Development of a Bench Mark Corpus to Support the Automatic Extraction of Drug-Related Adverse Effects from Medical Case Reports", Journal of Biomedical Informatics, vol. 45, 2012, pp. 885-892.
Kohita, et al, "Interactive Construction of User-Centric Dictionary for Text Analytics", In Proceedings of the 58th Annual Meeting of the Association for Computational Linguistics, 2020, pp. 789-799.
Lee, et al, "Overcoming Small-size Training Set Problem in Content-Based Recommendation: A Collaboration-based Training Set Expansion Approach", In Proceedings of the 11th International Conference on Electronic Commerce (ICEC), 2009, pp. 99-106.
Li, et al, "Contrastive Learning with Hard Negative Entities for Entity Set Expansion", arXiv preprint, 2022, 10 pages.
Lika, et al, "Facing the Cold Start Problem in Recommender Systems", Expert Systems with Applications, vol. 41, 2014, pp. 2065-2073.
Liu, et al, "Lexicon Modeling for Query Understanding", IEEE International Conference on Acoustics, Speech and Signal Processing (ICASSP), 2011, pp. 5604-5607.
Miller, "WordNET: A Lexical Database for English", Communications of the ACM, vol. 38, 1995, pp. 39-41.
Pantel, et al, "Web-scale Distributional Similarity and Entity Set Expansion", In Proceedings of the 2009 Conference on Empirical Methods in Natural Language Processing (EMNLP), 2009, pp. 938-947.
Rastogi, et al, "Neural Variational Entity Set Expansion for Automatically Populated Knowledge Graphs", Information Retrieval Journal, 2019, pp. 232-255.
Sadamitsu, et al, "Entity Set Expansion Using Interactive Topic Information", In Proceedings of the 26th Pacific Asia Conference on Language, Information, and Computation, 2012, pp. 108-116.
Sarmento, et al, "More like These: Growing Entity Classes from Seeds", In Proceedings of the Sixteenth ACM Conference on Information and Knowledge Management (CIKM), 2007, pp. 959-962.
Seldin, et al, "Evaluation and Analysis of the Performance of the EXP3 Algorithm in Stochastic Environments", In European Workshop on Reinforcement Learning, JMLR: Workshop and Conference Proceedings, vol. 24, 2012, 14 pages.
Shen, et al, "SynSetExpan: An Iterative Framework for Joint Entity Set Expansion and Synonym Discovery", arXiv preprint, 2020, 16 pages.
Shi, et al, "Entity set expansion in knowledge graph: a heterogeneous information network perspective", Frontiers of Computer Science, 2021, pp. 1-12.
Sutton, et al, "Multi-arm Bandits", Reinforcement Learning: An Introduction, Chapter 2, MIT press, 2014, pp. 31-52.
Thompson, "On the Likelihood That One Unknown Probability Exceeds Another in View of the Evidence of Two Samples", Biometrika, vol. 25, 1933; pp. 285-294.
Velardi, et al, "OntoLearn Reloaded: A Graph-Based Algorithm for Taxonomy Induction", Association for Computational Linguistics, vol. 39, 2013, pp. 665-707.
Wang, et al, "Automatic Set Expansion for List Question Answering", In Proceedings of the 2008 Conference on Empirical Methods in Natural Language Processing, 2008, pp. 947-954.
Wang, et al, "Iterative Set Expansion of Named Entities Using the Web", I., In 2008 eighth IEEE International Conference on Data Mining (ICDM), 2008; pp. 1091-1096.
Wang, et al, "Language-Independent Set Expansion of Named Entities Using the Web", In Seventh IEEE international conference on data mining (ICDM), 2007, pp. 342-350.
Wang, et al, "Semi-Supervised Learning of Semantic Classes for Query Understanding—from the Web and for the Web", In Proceedings of the 18th ACM Conference on Information and Knowledge Management, 2009, pp. 37-46.
Wu, et al, "A Survey of Human-In-The-Loop for Machine Learning", arXiv preprint, 2022, 22 pages.
Yan, et al, "End-to-End Bootstrapping Neural Network for Entity Set Expansion", In Proceedings of the AAAI Conference on Artificial Intelligence, vol. 34, 2020, pp. 9402-9409.
Yan, et al, "Global Bootstrapping Neural Network for Entity Set Expansion", In Findings of the Association for Computational Linguistics: EMNLP, 2020, pp. 3705-3714.
Yan, et al, "Learning to Bootstrap for Entity Set Expansion", In Proceedings of the 2019 Conference on Empirical Methods in Natural Language Processing and the 9th International Joint Conference on Natural Language Processing (EMNLP-IJCNLP), 2019, pp. 292-301.
Zhang, et al, "Empower Entity Set Expansion Via Language Model Probing", arXiv preprint, 2020, 11 pages.
Zhang, et al, "Entity set Expansion in Opinion Documents", In Proceedings of the 22nd ACM conference on Hypertext and Hypermedia, 2011, pp. 281-289.

(56) References Cited

OTHER PUBLICATIONS

Zhang, et al, "Entity Set Expansion via Knowledge Graphs", In Proceedings of the 40th International ACM SIGIR Conference on Research and Development in Information Retrieval, 2017, 4 pages.
Zheng, et al, "Entity Set Expansion with Meta Path in Knowledge Graph", In Pacific-Asia conference on knowledge discovery and data mining, Springer (PAKDD), 2017, pp. 317-329.
Zulkifly, et al, "Improved Machine Learning Model Selection Techniques for Solar Energy Forecasting Applications", International Journal of Renewable Energy Research (IJRER), vol. 11, 2021, pp. 308-319.

* cited by examiner

HIERARCHICAL MULTI-ARMED BANDIT FOR LEXICON EXPANSION

BACKGROUND

The present invention relates to computing technology, particularly systems, such as natural language parsing systems that use a hierarchical multi-armed bandit for lexicon expansion.

Artificial intelligence (AI) has aided several branches including natural language parsing, query generation, cognitive horizon surveillance, etc. that facilitate intelligent ranking of content, automatic categorization, and automatic query generation. Services, such as GOOGLE® Search, PUBMED®, etc., to name a few, enable access to content that was not historically achievable at the same speed. Many of these services rely on standard retrieval mechanisms for a user to find relevant content, which may typically be some form of a keyword search combined with various value selections (e.g., author, date, etc.).

The semantic Web community has developed beyond the barrier of keyword searching by designing methods to represent and query the data beyond mere keywords, such as using knowledge graphs. Some publishers benefit by augmenting content, for example encouraging authors to include semantically annotated content. Beyond that, AI models also facilitate lexicon set expansion, where an AI model suggests new entities to add to a predefined small seed set of entities.

SUMMARY

Embodiments of the present invention are directed to a computer-implemented method for selecting an artificial intelligence (AI) model. According to an aspect, a computer-implemented method includes receiving, by a multi-armed bandit agent, candidate entities from multiple set expansion models and selecting a subset of the candidate entities for a first set expansion task, wherein a first candidate entity of the selected subset of candidate entities is selected from a first model by a subject matter expert. The method also includes selecting, by the multi-armed bandit agent, based on the first candidate entity selected by the subject matter expert, the first model from the set expansion models for generating further candidate entities.

In one embodiment, the expansion models comprise AI models of different types.

In one embodiment, the expansion models are trained on different datasets.

In one embodiment, a frequency-based boosting (Marble-B) is used to generate initial candidate entities from the expansion models to alleviate a cold-start problem with the multi-armed bandit agent.

In one embodiment, for the frequency-based boosting, the initial candidate entities from all expansion models are captured and one or more most frequent candidate entities from the initial candidate entities are presented to the subject matter expert.

In one embodiment, to alleviate a cold-start problem with the multi-armed bandit agent, history-based boosting (Marble-H) is used to generate initial candidate entities from the expansion models.

In one embodiment, for the history-based boosting, in response to the subject matter expert selecting, at time t, the first candidate entity from the first model from the expansion models, the first model is rewarded and further, a second model that also generates the first candidate entity at time t+1, is also rewarded.

Embodiments of the present invention are directed to system having a memory and one or more processing units coupled with the memory, the one or more processing units configured to perform a method for selecting an artificial intelligence (AI) model. According to an aspect, a computer-implemented method includes receiving, by a multi-armed bandit agent, candidate entities from multiple set expansion models and selecting a subset of the candidate entities for a first set expansion task, wherein a first candidate entity of the selected subset of candidate entities is selected from a first model by a subject matter expert. The method also includes selecting, by the multi-armed bandit agent, based on the first candidate entity selected by the subject matter expert, the first model from the set expansion models for generating further candidate entities.

In one embodiment, the expansion models comprise AI models of different types.

In one embodiment, the expansion models are trained on different datasets.

In one embodiment, a frequency-based boosting (Marble-B) is used to generate initial candidate entities from the expansion models to alleviate a cold-start problem with the multi-armed bandit agent.

In one embodiment, for the frequency-based boosting, the initial candidate entities from all expansion models are captured and one or more most frequent candidate entities from the initial candidate entities are presented to the subject matter expert.

In one embodiment, to alleviate a cold-start problem with the multi-armed bandit agent, history-based boosting (Marble-H) is used to generate initial candidate entities from the expansion models.

In one embodiment, for the history-based boosting, in response to the subject matter expert selecting, at time t, the first candidate entity from the first model from the expansion models, the first model is rewarded and further, a second model that also generates the first candidate entity at time t+1, is also rewarded.

Embodiments of the present invention are directed to a computer program product having a memory with one or more computer executable instructions stored thereon, which when executed by one or more processing units cause the one or more processing units to perform a method for selecting an artificial intelligence (AI) model. According to an aspect, the method includes receiving, by a multi-armed bandit agent, candidate entities from multiple set expansion models and selecting a subset of the candidate entities for a first set expansion task, wherein a first candidate entity of the selected subset of candidate entities is selected from a first model by a subject matter expert. The method also includes selecting, by the multi-armed bandit agent, based on the first candidate entity selected by the subject matter expert, the first model from the set expansion models for generating further candidate entities.

In one embodiment, the expansion models comprise AI models of different types, the expansion models are trained on different datasets.

In one embodiment, to alleviate a cold-start problem with the multi-armed bandit agent, frequency-based boosting (Marble-B) is used to generate initial candidate entities from the expansion models.

In one embodiment, the frequency-based boosting, the initial candidate entities from all expansion models are captured and one or more most frequent candidate entities from the initial candidate entities are presented to the subject matter expert.

In one embodiment, to alleviate a cold-start problem with the multi-armed bandit agent, history-based boosting (Marble-H) is used to generate initial candidate entities from the expansion models.

In one embodiment, the history-based boosting, in response to the subject matter expert selecting, at time t, the first candidate entity from the first model from the expansion models, the first model is rewarded and further, a second model that also generates the first candidate entity at time t+1, is also rewarded.

Embodiments of the invention described herein address technical challenges in vehicle operation, particularly in fields of remote operation of vehicles.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings.

Figure 1:
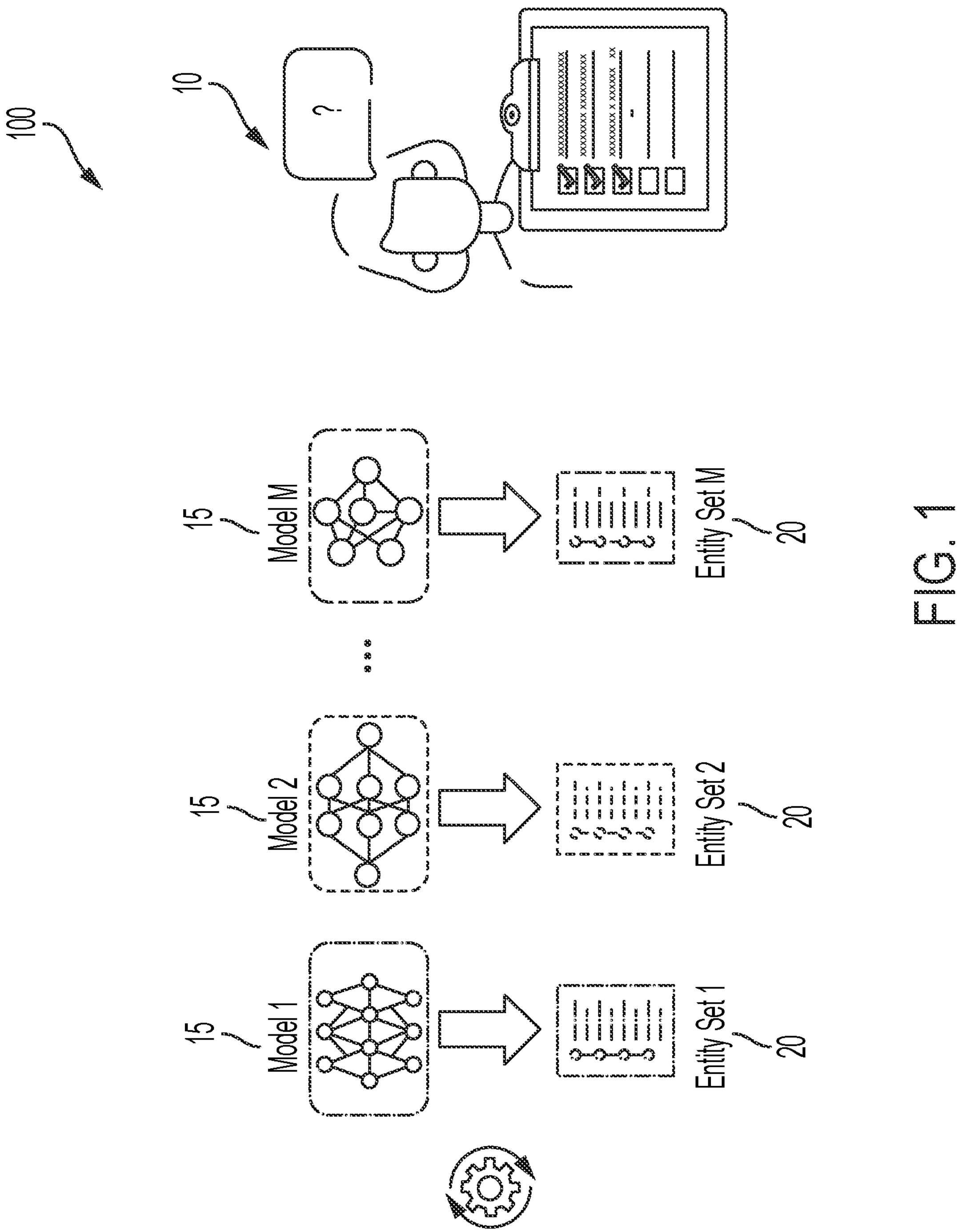
FIG. 1 depicts a block diagram for an entity set expansion in accordance with one or more embodiments of the present invention.

The diagrams depicted herein are illustrative. There can be many variations to the diagrams, or the operations described therein without departing from the spirit of the invention. For instance, the actions can be performed in a differing order, or actions can be added, deleted, or modified. Also, the term "coupled," and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number corresponds to the figure in which its element is first illustrated.

DETAILED DESCRIPTION

Embodiments of the invention described herein address technical challenges in fields to select an artificial intelligence (AI) model. For example, for the task of lexicon set expansion, where an AI model suggests new entities to add to a predefined small seed set of entities, several thousand of AI models are available. However, deciding which model to use for set expansion is non-trivial. In hindsight, some models can be 'off topic' for specific set expansion tasks, while others might work well initially but quickly exhaust what they have to offer. Additionally, some models may require more careful priming in the form of samples or feedback before being finetuned to the task at hand. Accordingly, selecting the correct AI model for the task at hand, such as lexicon expansion, is a technical challenge.

Embodiments of the present invention address such technical challenges by framing the model selection as a sequential non-stationary problem, where there exists a large number of diverse pretrained models that may or may not fit a task at hand, and an expert is shown one suggestion at a time to include in the set or not, i.e., accept or reject the suggestion. One or more embodiments of the present invention facilitate expanding the list with the most entities as quickly as possible using a hierarchical multi-armed bandit method for this task.

Entity set expansion is a technical challenge in computer science, particularly natural language processing (NLP), although there are several other applications. The entity set starts with a small set of seed entities and the expansion aims at expanding the set by including entities with similar semantics. The extracted entities can be useful for various NLP downstream tasks, such as opinion mining, semantic search, taxonomy construction, query understanding, question answering, and recommendation. Depending on the downstream task, target semantics for a set expansion task can be general or nuanced. For example, starting with a seed of "question answering" and "machine translation," the goal can be to extract entities encompassing the different areas of computer science research, for example, "image classification," "activity detection," and "recommender systems." On the other hand, the goal can be to extract NLP research tasks, such as "sentiment classification," and "text generation," etc.

In practice, there exist several technical challenges for set expansion methods. There are several multifaceted data sources in the real world. In addition, there exist a wide range of existing methods suitable for set expansion tasks. Each existing method has distinct unpredictable advantages and limitations that may be observed in hindsight. Exposing the methods to different data sources also dictates the quality of the trained models. For example, even if there is no pre-trained model for a particular domain or task easily accessible, there can be models trained on related data collections and domains. Being able to capture inherent similarities between such models allows for the retrieval of the most suitable methods. Yet, in many cases, choosing the best suitable method for a given set expansion task is not straightforward, and poses a technical challenge. Additionally, what kinds of data collections were used to train a model and what kind of useful data subsets each training set may contain are model properties that often remain unknown to users. Therefore, it is beneficial to develop post hoc frameworks that can select among multiple methods based on user feedback.

Techniques exist for selecting between multiple methods for other domains, such as recommender systems, digital advertising, forecasting, etc. However, the task of human-in-the-loop entity set expansion is uniquely challenging compared to the aforementioned tasks because, unlike the previous tasks, there is no predetermined objective function that can guide the training process for entity set expansion. Instead, the feedback must be collected from a subject-matter expert at each iteration, and hence the model needs to evolve based on iterative feedback. Additionally, each new entity task may be inherently different from previous ones. For example, the model that worked well for expanding a set of computer science terms might not work well for expanding a set of terms related to foods. Consequently, it is important to incorporate user feedback into the framework to guide the method selection process. Existing techniques that use human-in-the-loop set expansion are based on pre-selecting a single data source and a single method for set expansion. However, as discussed, restricting the solution to a single model or dataset is not optimal in many cases.

Technical solutions are described herein to address the technical challenges and deficits described above related to entity set expansion. Embodiments of the present invention frame the task of entity set expansion as a multi-source human-in-the-loop setting (see FIG. 1), and introduce Hierarchical Multi-Armed Bandit for Lexicon Expansion (MArBLE). In contrast to existing techniques where a system is required to select a model before starting the set expansion task, embodiments of the present invention (MArBLE) can select from multiple models without making any assumptions on the architectures or training data distributions of the available models. Embodiments of the present invention can gradually improve its selection based on subject-matter expert feedback. Specifically, the subject-matter expert decides whether to accept or reject entity candidates and MArBLE learns based on this type of feedback. While selecting a model is necessary for traditional approaches, which require knowledge about the architecture and the training distribution of the models, embodiments of the present invention remove such a pre-requisite, making the process more streamlined, faster, and less expensive. Furthermore, to address the cold-start problem of existing techniques, where models may not have sufficient data to provide good candidates in the initial rounds, embodiments of the present invention use at least one of two boosting strategies.

Accordingly, embodiments of the present invention are rooted in computing technology, particularly entity set expansion used in NLP. Embodiments of the present invention provide improvements to computing technology by providing improvements to entity set expansion by facilitating a human-in-the-loop feedback to be incorporated into each iteration of the entity set expansion solution based on a multi-armed bandit approach. Further, embodiments of the present invention provide a practical application of facilitating a framework for human-in-the-loop entity set expansion that, based on expert feedback, can select the most suitable model for the task at hand among a large number of available set expansion models. Further, to alleviate cold-start problems, embodiments of the present invention use at least one of two boosting methods that utilize collective information from all models to make better-informed decisions in the initial stages.

The efficacy of the MARBLE techniques used by one or more embodiments of the present invention has been validated through extensive experiments across at least three benchmark datasets and 81 set expansion models. Such experiments show that MArBLE, based embodiments of the present invention, along with their variants, can successfully identify useful models for different set expansion tasks.

As noted elsewhere herein, a technical challenge of the several methods of entity set expansion is that they cannot incorporate subject-matter expert feedback in their architectures. Such feedback can help prevent semantic drift and focus the set expansion task on the target granularity. Some existing techniques generate patterns from the seed entities to find similar terms in the corpus and validate the candidate terms with the help of a subject matter expert in each iteration. Some other existing techniques use a human-in-the-loop "explore and exploit" (EnE) paradigm, where the first step is to find similar terms in the corpus by using neural language modeling (i.e., explore phase) and later on generate more terms by employing modifications and extensions (i.e., exploit phase). Several other techniques similarly extract terms based on a weighted similarity function and optimize the process with user feedback. However, all such existing techniques are designed with specific models in mind and are not generalizable to handling multiple models. In contrast, embodiments of the present invention work can automatically select between a large set of available models and adjust based on user feedback.

FIG. 1 depicts a block diagram for an entity set expansion 100 according to one or more embodiments of the present invention. In set expansion approaches, a subject-matter expert 10 has to first select a model 15, a non-trivial decision to be made in real-world settings, as each model 15 may produce entity sets 20 with varying semantics. Additionally, a prerequisite of such an approach is that the expert 10 knows about the training distribution of the models 15 beforehand. Instead, embodiments of the present invention collect candidate entities from a large set of models 10 simultaneously, and progressively learns which model 10 to query in each iteration (round).

In one or more embodiments of the present invention, to address the technical challenges, the technical problem is set such that given an initial set of seed entities $\varepsilon=\{e_1 \ldots e_N\}$, the goal is to expand the set with more entities with similar semantics. A subject-matter expert 10 defines these latent semantics and are not given. Let $\mathcal{M}=\{m_1 \ldots m_M\}$ be the set of entity set expansion models that are available for the task. Each model $\mathcal{C}=m_i(\mathcal{P}^+, \mathcal{N}^-)$, $m_i \in \mathcal{M}$ takes as input a set of positive entities $\mathcal{P}^+$ and a set of negative entities $\mathcal{N}^-$, and returns a set of candidate entities $$C = \{e_i\}_{i=1}^{|C|}.$$

By considering both positive and negative samples, the model can focus more quickly on a specific density region of the hypothesis space. Let $\mathcal{O}$ be an oracle, i.e., subject matter expert 10, who provides a feedback $f(e_i) \in \{0,1\}, \forall e_i \in \mathcal{C}$, where 0 and 1 represents a negative and positive feedback respectively for each candidate $e_i \in \mathcal{C}$. Each model in $\mathcal{M}$ can have different characteristics, e.g., model architecture, model capacity, and training distributions differ, making each model suitable for different tasks. It is thus challenging to select between the set of available models without knowing the underlying model attributes and the training distribution. Even building an ensemble of models is non-trivial in this case, as the set expansion task can be very specific, making it impossible to know which models may be relevant. Consequently, it is beneficial to construct a framework that can dynamically improve model selection based on user feedback.

In some embodiments of the present invention, model selection can be framed as a multi-armed bandit problem, because each model can be treated as an arm and the feedback of the subject-matter expert as reward for the corresponding arms. At each time step t, the multi-armed bandit agent $A_j$ first selects a model $m_t$ based on probability vector $t \sim p_t \in [0,1]^M$, initialized uniformly. The selected model $m_t$ returns a set of candidate entities $C_t$ and the subject matter expert provides feedback for each candidate entity $f_t(e_i), \forall e_i \in \mathcal{C}_t$, i.e., whether to accept ($f_t(e_i)=1$) or reject ($f_t(e_i)=0$) a candidate entity $$e_i^1.$$

The accepted or rejected entities form subsets $$\mathcal{P}_t^+ = \{e_i \in C_t : f_t(e_i) = 1\} \text{ and } \mathcal{N}_t^- = \{e_i \in C_t : f_t(e_i) = 0\},$$

respectively, which are used to update the global positive and negative sets, i.e., $$\mathcal{P}^+ = \mathcal{P}^+ \cup \mathcal{P}_t^+,$$

and similarly for $\mathcal{N}^-$. The model $m_t$ for each entity candidate is rewarded, i.e., $$R_t(m_t, C_t) = |\mathcal{P}_t^+| - |\mathcal{N}_t^-|.$$

The process continues with the global set of positives $\mathcal{P}^+$ and negatives $\mathcal{N}^-$ fed to the model $m_{t+1}$ on the next round.

To balance exploitation (select a model that performed well in previous rounds) and exploration (explore the space of models), there exist several ways to update the probability vector $p_t$ based on the reward $R_t(m_t, C_t)$. For a given model $m_t$, bandit algorithms compute the distribution $p_t(m_t)$ such that it maximizes the long-term rewards. There are several existing methods to model $p_t(m_t)$. For example, Boltzmann exploration uses a softmax over the reward history to make a selection, as shown in Eq. 1.

$$p_t(m_t) = \frac{\exp(R_t(m_t, C_t)/\tau)}{\sum_{m_j \in M} \exp(R_t(m_t, C_t)/\tau)} \tag{1}$$

Here, $\tau$ is a temperature parameter that controls the degree of exploration. While Boltzmann exploration provides a simple yet efficient approach, the agent needs to sufficiently explore all models (arms) before making good decisions, which may be prohibitively expensive. Additionally, the need to tune the additional temperature parameter $\tau$ adds more computational overhead.

The family of UCB algorithms select a bandit with the highest upper confidence bound. For example, UCB-1 maximizes:

$$p_t(m_t) = \frac{(R_t(m_t, C_t)/\tau)}{s_t} + \sqrt{\frac{2\ln t}{s_t}}, \tag{2}$$

Here, $s_t$ is the number of times the model $m_t$ has been selected thus far and t is the time step (iteration). On the other hand, UCB-tuned makes use of an upper bound on the measured variance by maximizing:

$$\frac{R_t(m_t, C_t)}{s_t} + \sqrt{\frac{\ln t}{s_t}\min\left(\frac{1}{4}, V(s_t)\right)}, \tag{3}$$

Here, ¼ is an upper bound on the variance of Bernoulli random variable, and $V(s_t)$ is the measured variance.

In contrast, Thompson sampling models $p_t(m_t)$ based on Beta distribution derived from existing observations, i.e., $$p_t(m_t) = \text{Beta}(S_t(m_t)+1, U_t(m_t)+1), \tag{4}$$

where, $$S_t(m_t) = |\mathcal{P}_{mt}^+|$$

is the number of candidates from model $m_t$ that were accepted in all previous time steps 1, . . . , t−1, and similarly $$U_t(m_t) = |\mathcal{N}_{mt}^-|$$

is the number of candidates from model $m_t$ that were rejected in all previous time steps 1, . . . , t−1.

All the previously described agents explore the models to some extent, but settle down once some sufficiently good models are found. On the other hand, the Exp3 algorithm is designed “adversarially”, and continues searching for changes in the model rewards. The benefit to this approach is that set expansion models may perform differently with varying sizes of the set of positive and negative entities $\mathcal{P}^+$ and $\mathcal{N}^-$. However, this also has the risk of generating suboptimal results in general use cases. Exp3 introduces a new weight $w_t(m_t)$ for each arm (in this case, model candidate $m_t$) and uses these weights to select new candidates as follows:

$$p_t(m_t) = (1-\gamma)\frac{w_t(m_t)}{\sum_{m_j \in M} w_j(m_j)} + \frac{\gamma}{M} \tag{5}$$

Here, $\gamma \in [0, 1]$ is a factor controlling the probability to pick an action uniformly at random, and M is the total number of set expansion models. The weights are updated with $$w_{t+1}(m_t) = \begin{cases} w_t(m_t)\exp\left(\frac{\left(\frac{R_t(m_t, C_t)}{p_t(m_t)}\gamma\right)}{M}\right) & \text{if } m_t \text{ is selected} \\ w_t(m_t) & \text{otherwise} \end{cases}. \tag{6}$$

Each bandit algorithm can have suboptimal results depending on the domain and granularity of the semantics. In reality, it would be expensive to run experiments to discover the optimal algorithm among these bandit methods for a given set expansion task. Hence, embodiments of the present invention use a hierarchical multi-armed bandit method (named MArBLE) to adjust the model selection algorithm based on user feedback.

Figure 2:
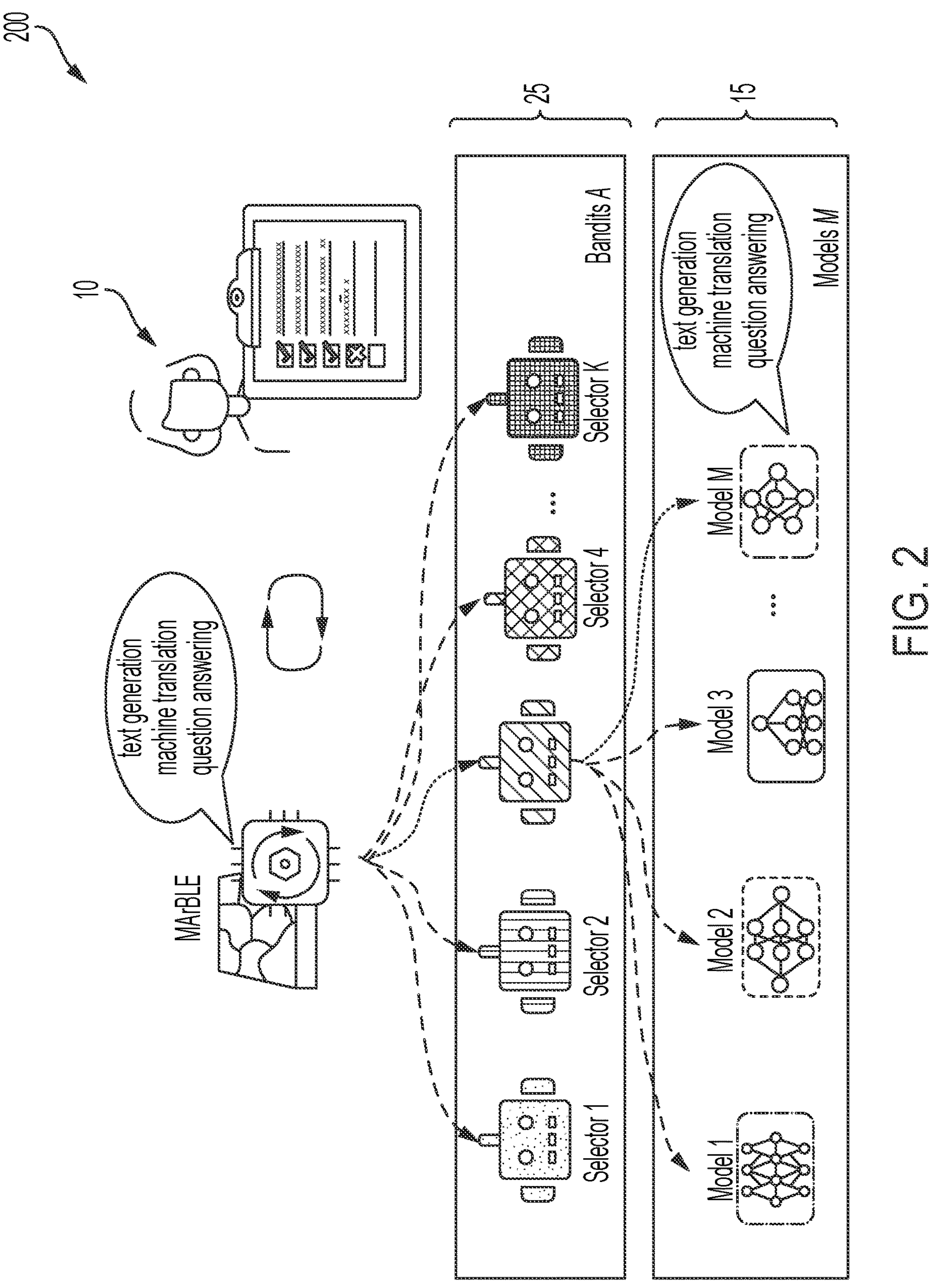
FIG. 2 depicts a block diagram of a set expansion system in accordance with one or more embodiments of the present invention.

FIG. 2 depicts a block diagram of a set expansion system 200 according to one or more embodiments of the present invention. The system 200 uses the MARBLE-based architecture provided by the technical solutions described herein. Based on the architecture, embodiments of the present invention provide a meta-learner that selects between a set of multi-armed bandit agents A 25. The selected multi-armed bandit agent $A_i$ 25 in turn selects between a set of available set expansion models M 15. The selected model $M_j$ outputs a set of candidate entities C, which are passed to the subject-matter expert 10 to accept or reject and update the global sets of positive and negative entities $\mathcal{P}^+$ and $\mathcal{N}^-$, respectively.

In other words, embodiments of the present invention provide a meta-learner that selects among a set of K bandit agents $\mathcal{A}=\{A_1 \ldots A_n\}$ 25. At each time step t, embodiments of the present invention evaluate the set of bandit agents 25 based on their history of rewards $R_t(A_i)=\{R_1(A_i), \ldots, R_{t-1}(A_i)\}$. Specifically, at time step t, embodiments of the present invention compute the posterior distribution $p(A_i|R_t(A_i))$ of selecting algorithm $A_i$ as $(A_i|R_t(A_i)) \propto p(A_i)p(R_t(A_i)|A_i)$, where the marginal likelihood $p(R_t(A_i)|A_i)$ is given by $$p(R_t(A_i) \mid A_i) = \frac{R_t(A_i)}{\sum_{A_j \in A} R_t(A_j)}, \tag{7}$$

The prior is assumed to be uniform, i.e., $p(A_i)=1/|\mathcal{A}|$. Conversely, the Bayes factor $$\frac{p(R_t(A_i) \mid A_i)}{p(R_t(A_j) \mid A_j)}$$

expresses the preference over two bandit agents $A_i$ 25 and $A_j$ 25.

A technical challenge with using bandits 25 in general is that models 15 may not have sufficient data for a new lexicon to make a good estimate. The lack of expert feedback at the initial stages makes all options equally possible. In other words, there is no domain knowledge that can be used a priori. Consequently, it is difficult to make inferences at the beginning. To alleviate this cold-start problem, two boosting algorithm variants, frequency-based boosting, and history-based boosting, explained below, are used by embodiments of the present invention.

Frequency-based boosting provides one variation of the MARBLE-based expansion system depicted in FIG. 2. In the beginning, many models 15 may provide the same generic suggestions. One way to alleviate this is to collect a few initial suggestions from all models 15 and present the most frequent ones to the subject matter expert 10. The benefit of this approach is that it is possible to provide the subject matter expert 10 with a small set of entities and reward a large set of models 15 based on the feedback at a very low cost. In the frequency-voted boosting setup, an initial $k_1 \geq 0$ candidates are selected from all models 15 and further, top $k_2$ candidates are selected based on majority voting, where $k_2 \leq k_1$. The selected top-$k_2$ candidates are presented to the subject-matter expert 10 and feedback is received on which candidates are accepted. The accepted candidate entities are added to the initial positive set. Additionally, we reward each model $m_i \in M$ with $$R_t(m_t, C_t) = |\mathcal{P}^+_{t,mt}|, \text{ where } \mathcal{P}^+_{t,mt}$$

is the number of accepted entities at timestep t from model $m_i$. In other words, the reward is proportional to the number of accepted entities found in the model's candidate list, thereby boosting models that are more likely to be useful.

History-based boosting provides one variation of the MARBLE-based expansion system depicted in FIG. 2. Although the subject matter expert 10 is shown the k=1 candidate entity at a time (top-k from each model 15), many of the other candidates lower in the list may also have been relevant. Some of these candidates may be provided to the subject-matter expert 10 in future iterations, perhaps due to being selected from a different model 15 in later rounds. Both, the model 15 that selects a candidate, as well as any other model 15 that produces this candidate lower in their list in previous steps are rewarded. In the history-based boosting setup, $k_1 \geq 0$ candidates are selected in every iteration. Only the top-k candidates are presented to the subject-matter expert 10 but the remaining (k1−k) candidate entities are saved in a hidden set. For each accepted entity at time step t, and in addition to rewarding the currently selected model $m_t$, any other models $m_{j,j\neq t} \in M$ that had previously provided the same candidate in the hidden set of entities are also rewarded. This strategy allows for minimizing the number of candidates passed to the subject matter expert 10 for annotation (minimizing human effort) but maximizes the efficacy of the proposed approach by retrospectively rewarding models 15 for lower-ranked candidates.

In some embodiments of the present invention that facilitate expansion of a lexicon, several different models 15 are generated and trained on different datasets. For example, the models 15 can be of type, EnE models, GLIMPSE models, WordNet models, or any other type of models. Each of the models 15 takes as input a set of positive entities and a set of negative entities and returns a list of ranked candidate entities.

Further, a predetermined number, e.g., three, four, five, etc., ground-truth lexicons from a diverse set of tasks are used as a subject-matter expert proxy. For all the tasks, the lexicon is randomly sampled, e.g., 10% of the lexicon, and used as the initial entity seed set. For example, consider that three datasets used include Adverse Drug Effect (ADE), Red-Green-Blue color names (RGB color names), and Food names. The ADE corpus includes a number of terms (i.e., entities) related to adverse drug effects extracted from medical case reports. Some examples of entities in the ADE corpus are 'coronary spasm,' 'lymphoproliferative disorders,' 'aseptic meningitis,' 'protamine allergy,' 'malignant lymphoma.' RGB color names corpus includes names of colors extracted from files including such names, and can include entities such as are 'royal blue,' 'brown,' 'dark green.' Food names corpus includes names of food items as entities, for example, 'shortbread cake small,' 'cookie mix prepared from powder,' 'crowberry food product,' 'watermelon seed oil,' 'coconut flakes.'

The multi-armed bandit agent technique described herein is used to select models 15 at each iteration. Several different bandit algorithms can be used, such as Boltzmann Exploration (BoltzExp), Upper Confidence Bound (UCB1), UCB-Tuned (UCB-T), Thompson Sampling (TS), and Exp3.

Figures 3A, 3B, 3C:
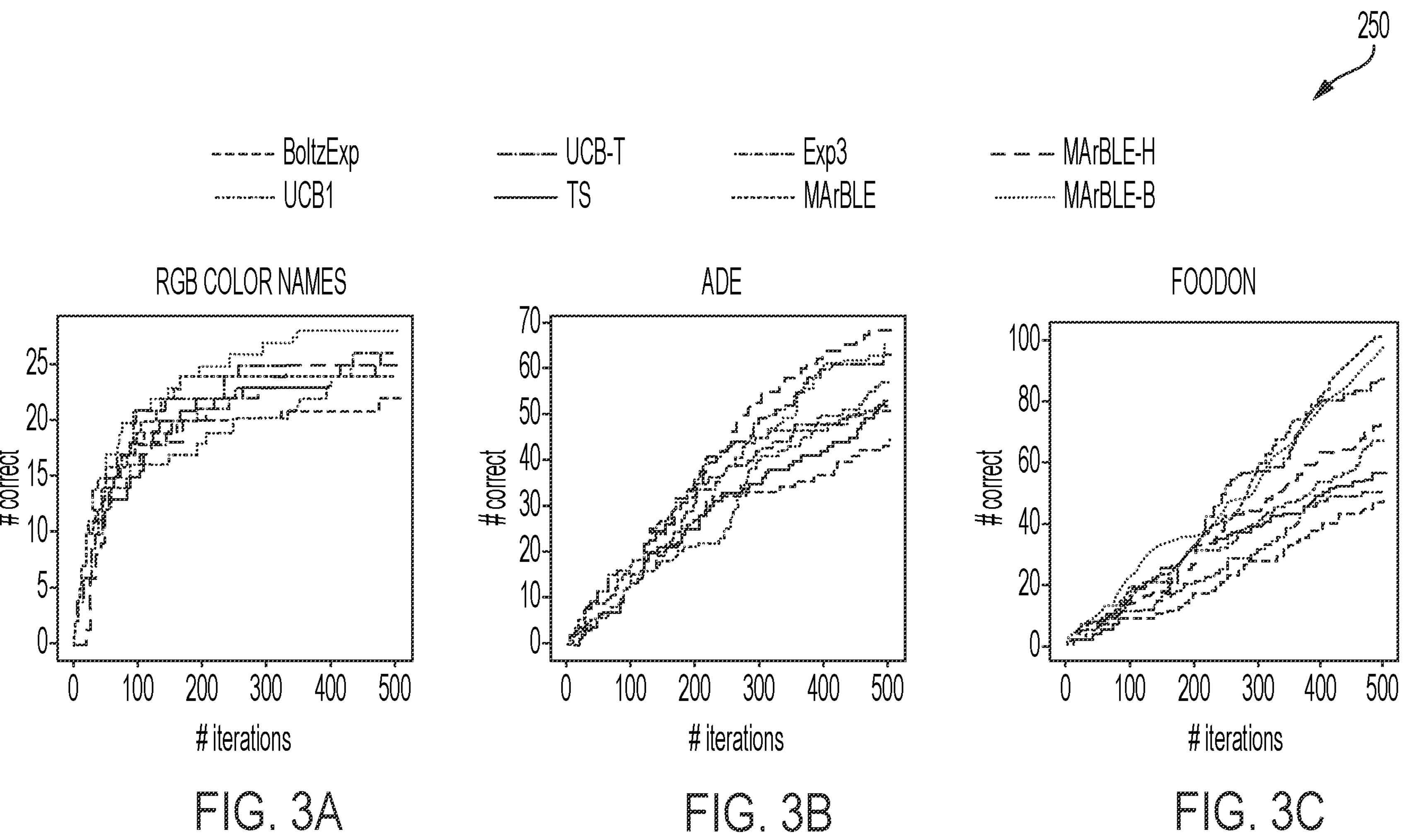
FIGS. 3A, 3B and 3C depict a graph representing the number of correct entities extracted at each iteration from the different datasets in accordance with one or more embodiments of the present invention.
Figures 4A, 4B, 4C:
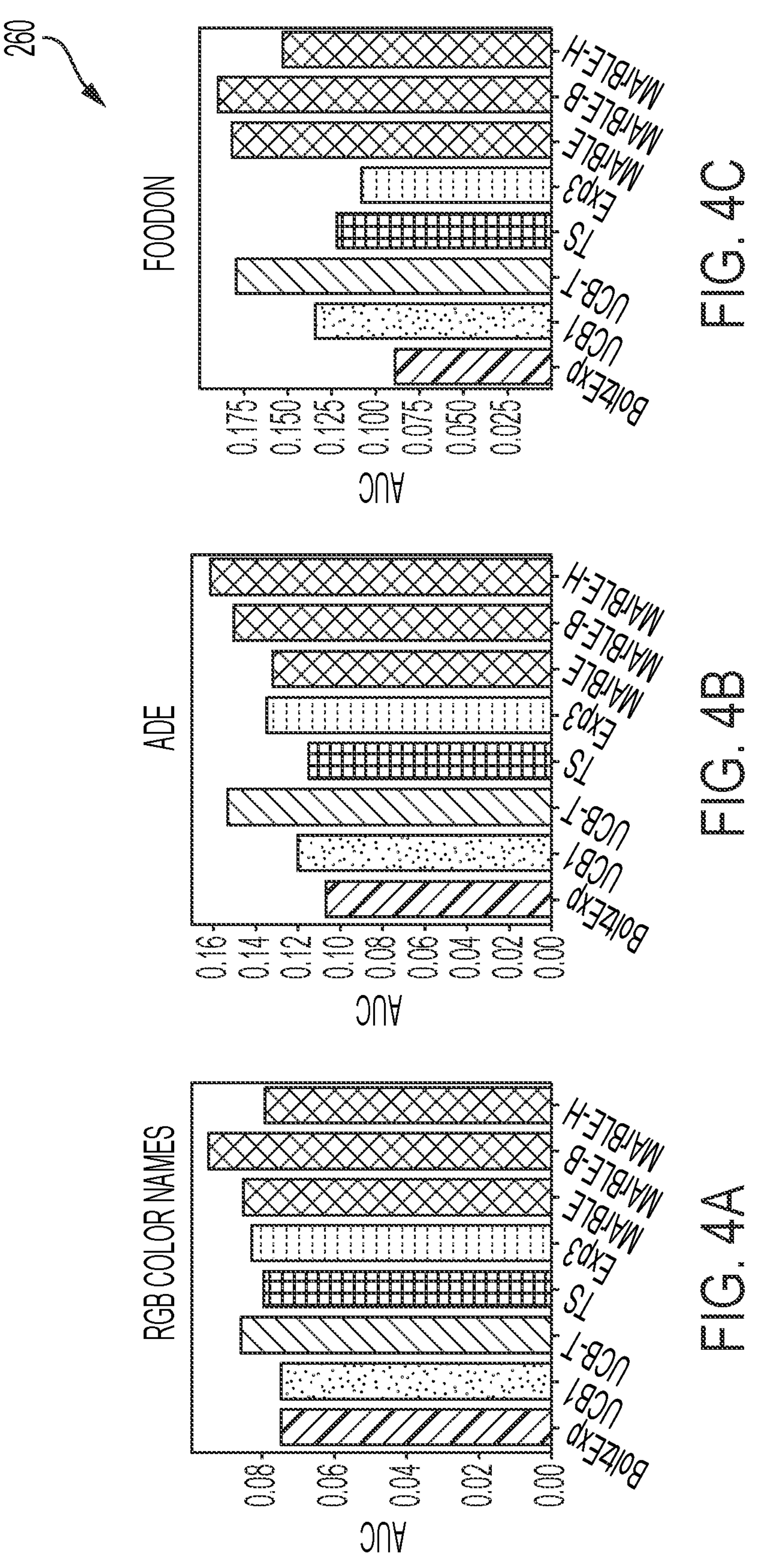
FIGS. 4A, 4B and 4C depict graph representing the performance of different bandit algorithm in accordance with one or more embodiments of the present invention.

FIGS. 3A, 3B and 3C depict graphs 250 representing the number of correct entities extracted at each iteration from the different datasets according to one or more embodiments of the present invention. Overall, UCB-T performs consistently well across the tasks in this particular example scenario, which suggests that this sequential model selection method would be a better fit for the entity set expansion task. However, in other example scenarios results may vary. Further, the difference among the bandit algorithms becomes more prominent as the size of the number of iterations grows. For example, for the RGB Color Names task, most of them converge quickly, except for BoltzExp. However, for the FoodON lexicon, there exists a large and clear gap between the different algorithms. UCB-T yields 87 accepted entities compared to the 47 accepted entities extracted using BoltzExp. In terms of relative gain, after 500 iterations, UCB-T generates 85.1% more accepted entities on FoodON and 43.1% on Adverse Drug Effects, compared to the worst performing algorithm BoltzExp. In terms of area under the curve, (AUC), this represents a 101.57% increase on FoodON and 44.18% on Adverse Drug Effects. This clearly shows the significance of selecting an appropriate bandit algorithm for the task. This is also visible in the AUC results shown in chart 260 in FIGS. 4A, 4B and 4C.

While in hindsight, based on the charts, UCB-T outperforms all other traditional bandit algorithms in these tasks selecting an appropriate method for each task can be non-trivial and expensive both in terms of computational resources and in terms of subject-matter expert 10 effort. Embodiments of the present invention, based on MARBLE, facilitate automatic selection with improved performance—computational overhead tradeoffs. Experimental results show that embodiments of the present invention perform well across all three lexicons. In addition, embodiments of the present invention outperform UCB-T by a large margin in the FoodON task, achieving 14.9% more accepted entities and 1.0% improvement on AUC. Additionally, MArBLE-B based techniques outperform UCB-T in the Adverse Drug Effects task, achieving 7.9% more accepted entities and 5.34% improvement on AUC. Likewise, MArBLE-B outperforms UCB-T in the RGB Color Names task, achieving 7.69% more accepted entities and 10.5% improvement on AUC. Additionally, MArBLE-B surpasses the performance of all the traditional bandit algorithms across all three tasks.

A qualitative analysis of the results also shows that the technical solutions provided by the embodiments of the present invention facilitate an improved outcome based on the percentage of times each algorithm selects different models. It was observed, in this experimental setup, that the top model choices for a task, e.g., the FoodON expansion task, across all bandits, are models 15 trained on food-related datasets, for example PizzaWP. There are also some models trained on general datasets, for example, UKWAC, a British English corpus from the .uk domain. On the other hand, a popular choice for the ADE task is models trained on medical-related datasets, i.e., MIMIC II, MIMIC III, DynaMed, COVID19, NEJM (New England Journal of Medicine), etc. This further demonstrates that the techniques provided by embodiments of the present invention can successfully discover useful models for the task at hand.

Figure 5:
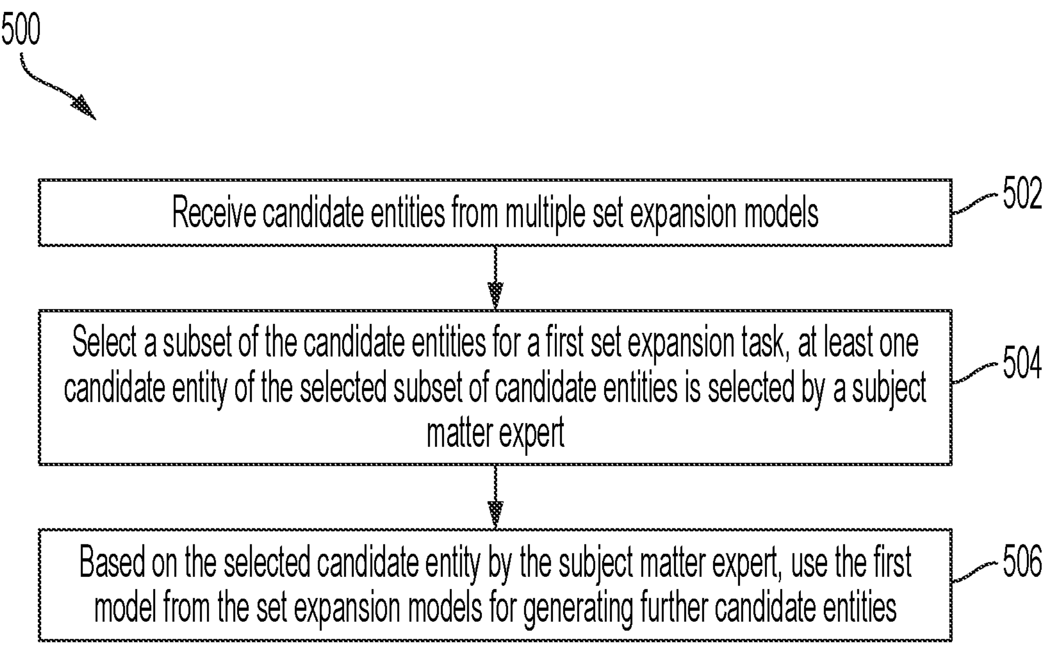
FIG. 5 depicts a flowchart of a method for selecting an artificial intelligence (AI) model in accordance with one or more embodiments of the present invention.

FIG. 5 depicts a flowchart of a method for selecting an artificial intelligence (AI) model according to one or more embodiments of the present invention. The method includes receiving, by a multi-armed bandit agents 25, candidate entities from multiple set expansion models 15, at block 502. The method further includes selecting a subset of the candidate entities for a first set expansion task, wherein a first candidate entity of the selected subset of candidate entities is selected by a subject matter expert 10, at block 504. The method further includes selecting, by the multi-armed bandit agents 25, based on the first candidate entity selected by the subject matter expert 10, the first model 15 from the set expansion models 15 for generating further candidate entities, at block 506. The selection of the candidate entities and the models 15 is based on the Marble-based techniques described herein by maintaining a positive candidate set and a negative candidate entity set at each iteration and rewarding the first model 15 based on the subject matter expert 10 selecting a candidate entity generated by the first model 15.

The expansion models 15 are AI models of different types, and which are trained on different datasets.

In some embodiments of the present invention, to alleviate a cold-start problem with the multi-armed bandit agent, frequency-based boosting (Marble-B) is used to generate initial candidate entities from the expansion models 15. For the frequency-based boosting, the initial suggestions from all expansion models 15 are captured and the most frequent candidate entities from the initial suggestions are presented to the subject matter expert 10.

In some embodiments of the present invention, to alleviate a cold-start problem with the multi-armed bandit agent, history-based boosting (Marble-H) is used to generate initial candidate entities from the expansion models. For the history-based boosting, in response to the subject matter expert selecting, at time t, a first candidate entity from a first model from the expansion models, the first model is rewarded and further, a second model that also generates the first candidate entity at time t+1, is also rewarded.

Embodiments of the present invention address a technical challenge rooted in computing technology and provide a practical application. Although many set expansion methods are available, it is non-trivial to select a suitable model for a particular task as such selection requires significant a-priori knowledge about the method, the model architecture, and the training data distribution. It can also be beneficial to draw candidates from multiple models. Embodiments of the present invention provide human-in-the-loop set expansion and utilize bandit strategies to automatically select models based on a subject-matter expert's feedback. Further, embodiments of the present invention provide a hierarchical multi-armed bandit approach, termed MArBLE, as a meta-learner that selects among the set of bandit methods. Additionally, embodiments of the present invention provide two boosting methods to improve performance in cold-start scenarios. MArBLE alleviates the need to select appropriate exploration mechanisms. Extensive experiments show that MArBLE based techniques described herein, and their variants can reach and sometimes surpass the performance of bandit baselines.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 6:
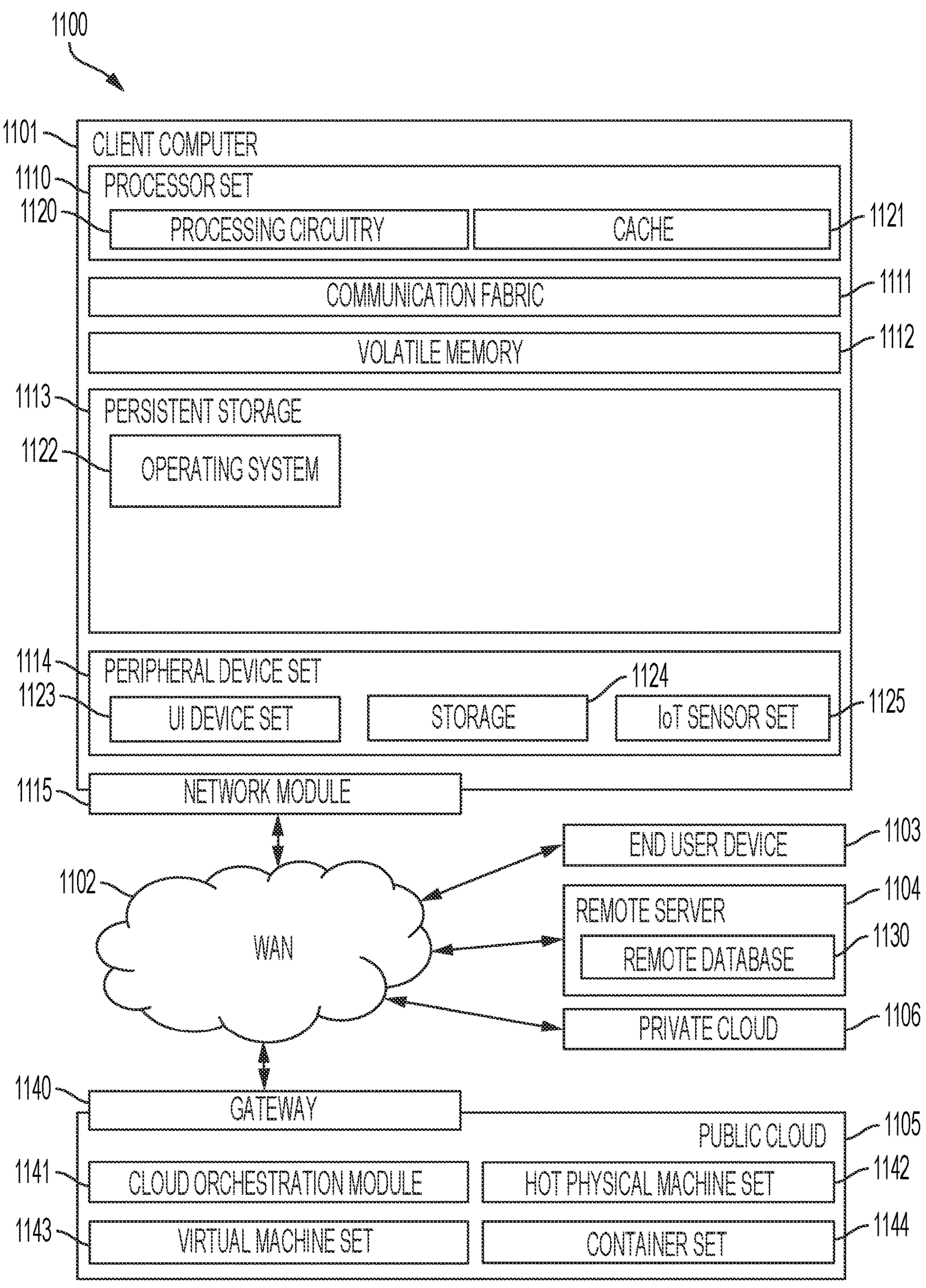
FIG. 6 depicts a computing environment in accordance with one or more embodiments of the present invention.

FIG. 6 depicts a computing environment in accordance with one or more embodiments of the present invention. Computing environment 1100 contains an example of an environment for the execution of at least some of the computer code involved in performing the inventive methods, such as assigning one or more remote pilots to a set of remotely controlled vehicles, detecting that a remote pilot needs to be replaced, generating a single data stream using data streams from several sources, etc., computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122, as identified above), peripheral device set 1114 (including user interface (UI), device set 1123, storage 1124, and Internet of Things (IOT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smartwatch or other wearable computer, mainframe computer, quantum computer or any other form of computer or mobile device now known or to be developed in the future that is capable of running a program, accessing a network, or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 800 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 800 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The present invention can be a system, a method, and/or a computer program product at any possible technical detail level of integration. The computer program product can include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selecting an artificial intelligence (AI) model, the computer-implemented method comprising:

receiving, by a multi-armed bandit agent, candidate entities from multiple set expansion models, wherein the multiple set expansion models comprise a first AI model and a second AI model previously trained on different datasets;

selecting a subset of the candidate entities for a first set expansion task, wherein a first candidate entity of the selected subset of candidate entities is selected from the first AI model by a subject matter expert;

selecting, by the multi-armed bandit agent, based on the first candidate entity selected by the subject matter expert, the first AI model from the set expansion models for generating further candidate entities;

in response to the first candidate entity from the first AI model being selected, selecting, without having knowledge of the different datasets and while avoiding knowledge of the training distribution of the different datasets, the second AI model configured to output the first candidate entity, wherein both the first AI model and the second AI model are configured to output the first candidate entity based on receiving input of a set of positive inputs and a set of negative inputs such that a reward is given to the first AI model and the second AI model for generating the first candidate entity, wherein the set of positive inputs and the set of negative inputs are input to the first AI model and the second AI model after the first AI model and the second AI model have been previously trained on the different datasets; and causing the first AI model and the second AI model selected to be executed for generating an expansion to a lexicon for natural language processing (NLP).

2. The computer-implemented method of claim 1, wherein the NLP is executed for at least one of a query understanding and a question answering.

3. The computer-implemented method of claim 1, wherein the first AI model outputs a first list comprising the first candidate entity and the second AI model outputs a second list comprising the first candidate entity.

4. The computer-implemented method of claim 1, wherein to alleviate a cold- start problem with the multi-armed bandit agent, frequency-based boosting (Marble-B) is used to generate initial candidate entities from the expansion models.

5. The computer-implemented method of claim 4, wherein for the frequency-based boosting:

all AI models of the expansion models are executed in order to generate the initial candidate entities; and in response to executing the all AI models of the expansion to generate the initial candidate entities, the initial candidate entities from the all AI models are captured and one or more most frequent candidate entities from the initial candidate entities are presented to the subject matter expert.

6. The computer-implemented method of claim 1, wherein to alleviate a cold- start problem with the multi-armed bandit agent, history-based boosting (Marble-H) is used to generate initial candidate entities from the expansion models.

7. The computer-implemented method of claim 6, wherein for the history-based boosting, in response to the subject matter expert selecting, at time t, the first candidate entity from the first AI model from the expansion models, the first AI model is rewarded and further, a second model that also generates the first candidate entity at time t+1, is also rewarded.

8. A system comprising:

a memory; and one or more processing units coupled with the memory, the one or more processing units configured to perform a method for selecting an artificial intelligence (AI) model, the method comprising:

receiving, by a multi-armed bandit agent, candidate entities from multiple set expansion models, wherein the multiple set expansion models comprise a first AI model and a second AI model previously trained on different datasets;

selecting a subset of the candidate entities for a first set expansion task, wherein a first candidate entity of the selected subset of candidate entities is selected from the first AI model by a subject matter expert;

selecting, by the multi-armed bandit agent, based on the first candidate entity selected by the subject matter expert, the first AI model from the set expansion models for generating further candidate entities;

in response to the first candidate entity from the first AI model being selected, selecting, without having knowledge of the different datasets and while avoiding knowledge of the training distribution of the different datasets, the second AI model; configured to output the first candidate entity, wherein both the first AI model and the second AI model are configured to output the first candidate entity based on receiving input of a set of positive inputs and a set of negative inputs such that a reward is given to the first AI model and the second AI model for generating the first candidate entity, wherein the set of positive inputs and the set of negative inputs are input to the first AI model and the second AI model after the first AI model and the second AI model have been previously trained on the different datasets; and causing the first AI model and the second AI model selected to be executed for generating an expansion to a lexicon for natural language processing (NLP).

9. The system of claim 8, wherein the NLP is executed for at least one of a query understanding and a question answering.

10. The system of claim 8, wherein the first AI model outputs a first list comprising the first candidate entity and the second AI model outputs a second list comprising the first candidate entity.

11. The system of claim 8, wherein to alleviate a cold-start problem with the multi-armed bandit agent, frequency-based boosting (Marble-B) is used to generate initial candidate entities from the expansion models.

12. The system of claim 11, wherein for the frequency-based boosting:

all AI models of the expansion models are executed in order to generate the initial candidate entities; and in response to executing the all AI models of the expansion to generate the initial candidate entities, the initial candidate entities from the all AI models are captured and one or more most frequent candidate entities from the initial candidate entities are presented to the subject matter expert.

13. The system of claim 8, wherein to alleviate a cold-start problem with the multi-armed bandit agent, history-based boosting (Marble-H) is used to generate initial candidate entities from the expansion models.

14. The system of claim 13, wherein for the history-based boosting, in response to the subject matter expert selecting, at time t, the first candidate entity from the first AI model from the expansion models, the first AI model is rewarded and further, a second model that also generates the first candidate entity at time t+1, is also rewarded.

15. A computer program product comprising a memory with one or more computer executable instructions stored thereon, which when executed by one or more processing units cause the one or more processing units to perform a method for selecting an artificial intelligence (AI) model, the method comprising:

receiving, by a multi-armed bandit agent, candidate entities from multiple set expansion models, wherein the multiple set expansion models comprise a first AI model and a second AI model previously trained on different datasets;

selecting a subset of the candidate entities for a first set expansion task, wherein a first candidate entity of the selected subset of candidate entities is selected from the first AI model by a subject matter expert;

selecting, by the multi-armed bandit agent, based on the first candidate entity selected by the subject matter expert, the first AI model from the set expansion models for generating further candidate entities;

in response to the first candidate entity from the first AI model being selected, selecting, without having knowledge of the different datasets and while avoiding knowledge of the training distribution of the different datasets, the second AI model, configured to output the first candidate entity, wherein both the first AI model and the second AI model are configured to output the first candidate entity based on receiving input of a set of positive inputs and a set of negative inputs such that a reward is given to the first AI model and the second AI model for generating the first candidate entity, wherein the set of positive inputs and the set of negative inputs are input to the first AI model and the second AI model after the first AI model and the second AI model have been previously trained on the different datasets; and causing the first AI model and the second AI model selected to be executed for generating an expansion to a lexicon for natural language processing (NLP).

16. The computer program product of claim 15, wherein the expansion models comprise AI models of different types; and wherein the first AI model outputs a first list comprising the first candidate entity and the second AI model outputs a second list comprising the first candidate entity.

17. The computer program product of claim 15, wherein to alleviate a cold-start problem with the multi-armed bandit agent, frequency-based boosting (Marble-B) is used to generate initial candidate entities from the expansion models.

18. The computer program product of claim 17, wherein for the frequency-based boosting:

all AI models of the expansion models are executed in order to generate the initial candidate entities; and in response to executing the all AI models of the expansion to generate the initial candidate entities, the initial candidate entities from the all AI models are captured and one or more most frequent candidate entities from the initial candidate entities are presented to the subject matter expert.

19. The computer program product of claim 15, wherein to alleviate a cold-start problem with the multi-armed bandit agent, history-based boosting (Marble-H) is used to generate initial candidate entities from the expansion models.

20. The computer program product of claim 19, wherein for the history-based boosting, in response to the subject matter expert selecting, at time t, the first candidate entity from the first AI model from the expansion models, the first AI model is rewarded and further, a second model that also generates the first candidate entity at time t+1, is also rewarded.

* * * * *